March 10, 1964 V. FUKA 3,124,111
FUEL INJECTION SYSTEM
Original Filed Sept. 18, 1961 2 Sheets-Sheet 1
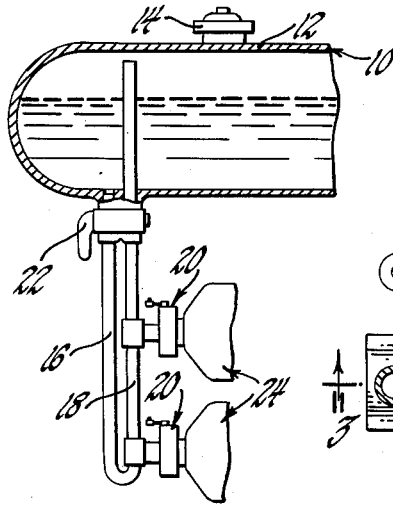
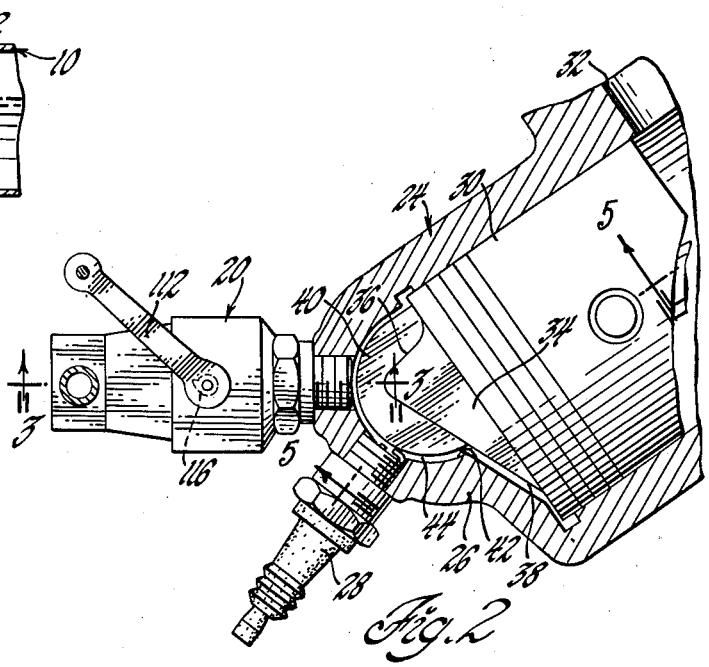
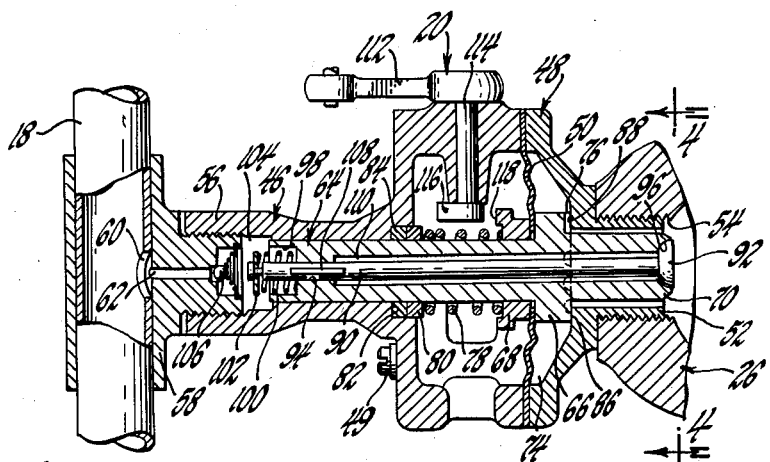
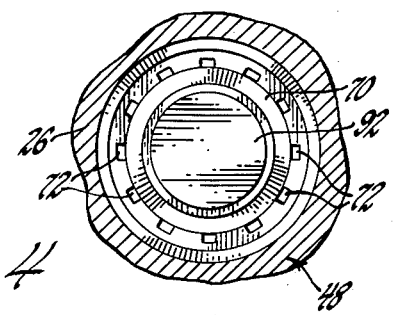
INVENTOR.
Vaclav Fuka
BY
Barnard & McGlynn
ATTORNEYS March 10, 1964 V. FUKA 3,124,111
FUEL INJECTION SYSTEM
Original Filed Sept. 18, 1961 2 Sheets-Sheet 2

INVENTOR.
Vaclav Fuka
BY
Barnard & McGlynn
ATTORNEYS

United States Patent Office 3,124,111
Patented Mar. 10, 1964

3,124,111
FUEL INJECTION SYSTEM
Vaclav Fuka, 31306 Campbell, Madison Heights, Mich.
Original application Sept. 18, 1961, Ser. No. 138,800, now Patent No. 3,101,701, dated Aug. 27, 1963. Divided and this application May 7, 1962, Ser. No. 192,842
2 Claims. (Cl. 123—32)

The present invention relates to a new and improved fuel system and combustion chamber arrangement for an internal combustion engine particularly of the two-cycle type, and is a division of Serial No. 138,800, Fuka, filed September 18, 1961, now Patent No. 3,101,701.

As in all two-cycle engines, the suction or intake and compression portions of the cycle occur during the last part of the downward movement and most of the upward movement of the piston, while the combustion and exhaust portions of the cycle occur during the last part of the upward movement and most of the downward movement of the piston. The basic advantage of the two-cycle engine being in the matter of cost as a result of which it is frequently used in boat motors, lawn mowers and other relatively small power applications.

Heretofore, it has not been economically feasible to utilize a fuel injection system with an inexpensive two-cycle engine. Accordingly, the operating cost and performance advantages of fuel injection have not been available with such engines.

It is an object of the present invention to provide a relatively inexpensive fuel injection system for a two-cycle engine and further to utilize such fuel injection system with a unique combustion chamber design which results in a two-cycle engine giving improved economy and performance.

In general, the subject fuel injection system includes a fuel inlet valve adapted to openly communicate with the combustion chamber and which valve is responsive to combustion chamber pressure to open to a predetermined extent and in so opening to provide a metered quantity of fuel to the combustion chamber. At the same time, the fuel inlet valve is disposed proximate a spark plug member which cooperate with a uniquely formed piston head to insure that air flow will cause the injected fuel to flow in the direction of the spark plug.

In the present invention the cylinder and piston heads are especially formed to provide a small combustion chamber when the piston is in its uppermost position so as to initially permit the combustion of a relatively small charge proximate the spark plug.

In the present invention the air throttle ordinarily used in carburetors is eliminated and power is regulated by controlling the admission of fuel to the engine. This arrangement is possible by applying the so-called stratified combustion method which permits burning of small fuel charges in the proximity of the spark plug independently of the overall air-fuel ratio. The two-cycle engine is especially suited for this method of combustion because the scavenging air forms a stream carrying the injected fuel toward the spark plug.

The present invention also lends itself to the use of a secondary combustion chamber of small size proximate the fuel inlet valve and spark plug for burning very small fuel charges such as are used during part load operation. This latter feature is possible in two-cycle engines because of the particular forms of piston head construction needed to promote the scavenging of burned gases.

It is still another object of the present invention to provide a simple fuel injector requiring no rotating drive members and readily adaptable to any individual cylinder to permit complete interchangeability of such injector between any of the cylinders of a multi-cylinder engine.

Other objects and advantages of the present invention will be apparent from a perusal of the detailed description which follows considered in conjunction with the illustrative drawings.

In the drawings:

FIGURE 1 is an elevational view of a portion of an engine embodying the subject invention;

FIGURE 2 is an enlarged sectional view through a cylinder head showing the disposition of the fuel injector and spark plug as well as the combustion chamber configuration;

FIGURE 3 is a sectional view along line 3—3 of FIGURE 2 showing the details of the fuel injector;

FIGURE 4 is a view along line 4—4 of FIGURE 3;

Figure 5:
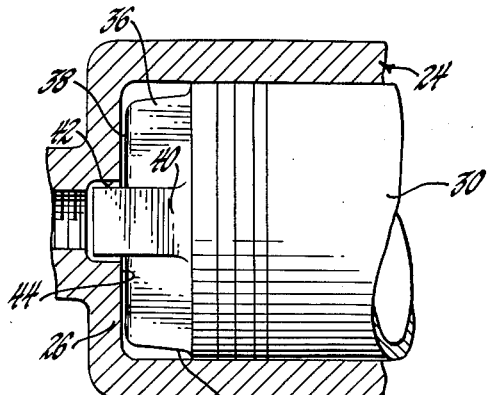
FIGURE 5 is a sectional view of the combustion chamber and piston head construction as seen 90° from the view of FIGURE 2.

Inasmuch as an important aspect of the present invention relates to a unique fuel system utilizing the stratified combustion cycle, it will be well to briefly describe such cycle and its advantages. The stratified combustion cycle (also called throttle fuel cycle) is a method of producing a combustible charge in an internal combustion engine by injecting fuel into the proximity of the spark plug at the time of ignition or very slightly before. In this way, only a small part of the charge may be combustible, the main portion of it being compressed air. No attempt is made to obtain the uniform mixture, to the contrary, a pre-combustion chamber is frequently used separating the combustible part of the charge from the air. This kind of working cycle has important advantages: (1) extremely small charge can be burned; (2) no air throttle is necessary; (3) accurate fuel distribution in multi-cylinder engine is of secondary importance; (4) no cold starting or running problem; (5) no transient condition problem; (6) complete combustion possible due to excess of air during partial load operation; (7) improved overall economy by about 30% with gain as high as 42% at small engine loads being theoretically possible.

Whereas the carburetor type engine cannot use a leaner air-fuel mixture than 16:1, and this only when the engine is warm, in stratified combustion cycle mixtures as lean as 50:1 are practical and as lean as 115:1 have been obtained experimentally. In carburetor type engines, light load is obtained by filling the cylinder with air only in part and adding proportionate quantities of fuel sufficient to create a combustible mixture usually in the 14:1 or 12:1 range. This is equivalent to lowering compression ratio during part load operation and results in a considerable drop in the overall efficiency.

In the stratified combustion cycle, however, the cylinder gets full air charge at any engine load and only the injected fuel quantity determines the power output. There is no air throttle. The engine works all the time at the maximum compression ratio for which it was built. This is similar to the diesel cycle known for fuel economy. The stratified combustion cycle is suitable for any size of engine and results in economy at partial load. At full load, there is no particular advantage against carburetor operation. Large engines, however, such as are in common use today, particularly in America, would be especially benefited by such a system because they operate practically all the time at partial load. Further, because this combustion cycle normally operates with an excess of air, it should be contaminating the atmosphere to a considerably lesser degree than engines with carburetors.

While the present invention may be utilized with any small two-cycle engine, for present purposes it is shown as applied to an outboard engine partially indicated generally at 10 in FIGURE 1. Engine 10 includes a fuel tank 12 having a filler cap 14. Fuel is adapted to feed by gravity through a U-shape pipe arrangement including a first leg 16 and a second leg 18 which terminates in a portion disposed generally above the fuel level in the tank 12. This arrangement provides a venting arrangement in the fuel supplying pipe to prevent any air or vapor pockets forming in the system. Thus, the left branch or pipe 16 brings fresh fuel to the injectors indicated generally at 20, while the upper part of right pipe 18 permits venting of vapors into the space above the fuel in tank 10. A common valve 22 is adapted to shut off fuel flow in both pipes 16 and 18 when the engine is shut down.

Engine cylinders 24 are aligned and connect with the fuel supply system through injectors 20.

As best seen in FIGURE 2, engine cylinder 24 includes a dome shaped cylinder head 26 to which fuel injector 20 and spark plug 28 are secured in close proximity so as to communicate with the combustion chamber space defined by the cylinder head and the upper portion of piston 30.

Figure 6:
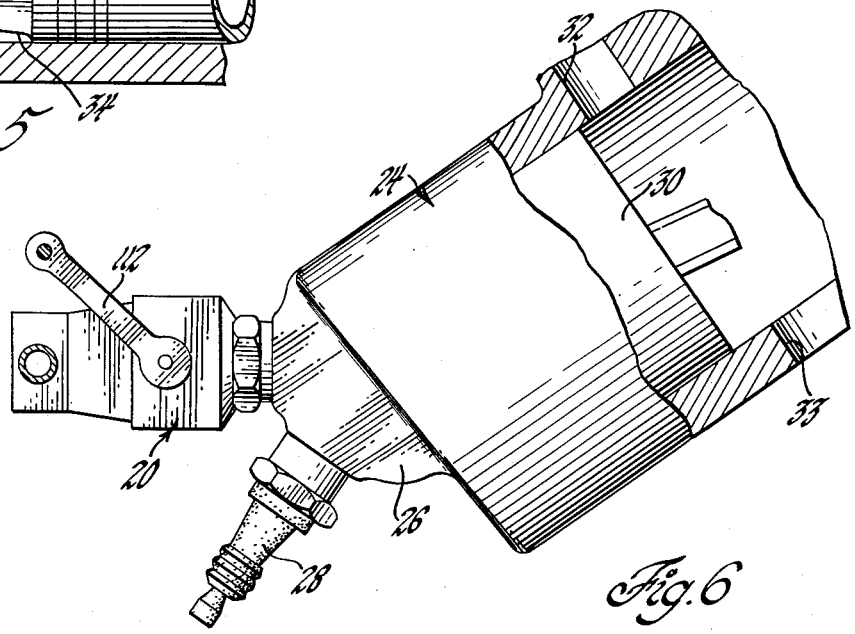
FIGURE 6 is a partially sectioned view of cylinder.

Being a two-cycle type engine, each cylinder includes the conventional air intake and exhaust ports 32 and 33 in the side wall thereof as shown in FIGURE 6. As is common, through a portion of the downward travel and at the beginning of the upward travel of piston 30 both the air intake and exhaust ports are open together for a short interval which permits the fresh air to completely scavenge the exhaust gases from the combustion space. As piston 30 moves upwardly toward cylinder head 26, the intake port 32 is cut off before exhaust port 33 since at the end of the working stroke the exhaust port must open first.

To facilitate scavenging of the exhaust gases from the combustion space at the end of the working stroke of piston 30, the piston head is provided with a projection 34 which incluudes a steeply inclined face 36 proximate the air intake port side of the cylinder and a gradually sloping back wall 38 which causes the fresh incoming air to be directed upwardly along the cylinder wall to scavenge and exhaust the expanded gases through the exhaust port on the opposite wall of the cylinder. A rib 40 runs across projection 34 perpendicularly to the top surface of the piston and generally aligned with the direction of travel of air through the combustion space.

Rib 40 fits with a slight clearance into a cavity 42 provided in cylinder head 26. The space between rib 40 and cylinder head wall cavity 42 defines an auxiliary combustion chamber 44 which is in immediate and proximate communication with injector 20 and spark plug 28.

Injector 20 includes a pair of casing members 46 and 48 suitably secured together, as through studs 49, to peripherally clamp a heat resistant diaphragm 50 therebetween. The lower casing 48 includes an externally threaded portion 52 adapted to be threaded within opening 54 of cylinder head 26. Upper casing 46 includes an internally threaded portion 56 adapted to receive a fitting 58 connected to fuel line 18. Fuel line 18 includes an opening 60 which communicates with a longitudinal passage 62 formed in fitting 58 and through which fuel is adapted to be supplied to the injector.

A plunger 64 is centrally secured to diaphragm 50 which seats against a flange 66 and is clamped thereto by a threaded collar member 68. Plunger 64 is slidably supported in casing 46 and 48.

The inner or combustion chamber end 70 of plunger 64 is slidably supported in portion 52 of casing 48. Casing portion 52 internally includes a plurality of longitudinally extending and circumferentially spaced splines 72. Splines 72 have several functions the first of which is to permit the pressure in the combustion chamber to be transmitted to chamber 74 defined by diaphragm 50 and casing 48.

Radial passages 76 formed in the casing face of flange 66 permit splines to freely communicate with diaphragm chamber 74. Plunger 64 is urged in a downwardly direction or toward the combustion chamber by a spring 78 one end of which seats against plunger collar 68 and the other end of which seats against a spacer 80. Spacer 80, in turn, seats against a counterbored portion 82 of casing 46 through a seal member 84. Thus normally, face 86 of plunger flange 66 seats against surface 88 of chamber 74.

Plunger 64 is hollow and slidably supports therein a valve member including a stem portion 90 and a head portion 92. Stem 90 is supported upon a bearing surface 94 formed within plunger 64 while convex head 92 is adapted to seat against a concave seat 96 formed in the inner end of plunger portion 70. Plunger 64 is counterbored at its outer end to provide a recess 98 in which one end of spring 100 seats. The other end of spring 100 biases valve 90—92 toward closed position through a disc spring seat member 102 which is loosely secured to the outer end of valve stem 90. Thus spring 100 tends to cause valve head 92 to seat against the inner end of plunger seat 96 and prevent fuel flow therethrough. The outer end of plunger 64 comunicates with a fuel chamber 104 which is adapted to be supplied with fuel from conduit or pipe 18 through a ball check valve 16 biased against the inner end of fitting passage 62.

Valve stem 90 has one or more longitudinally extending recesses 108 formed in the periphery thereof through which fuel chamber 104 is adapted to communicate with bore 110 of plunger 64. In this way, fuel is adapted to flow from chamber 104 through recesses 108, counterbore 110 and into the combustion chamber when valve 90—92 is opened.

As piston 30 moves upwardly in cylinder 24, the pressure transmitted through splines 72 to chamber 74 will eventually build up to the point where the force of spring 78 is overcome thereby moving plunger 64 outwardly. The outward movement of plunger 64 will cause ball check 106 to seat in which event the fuel pressure in chamber 104 will overcome spring 100 and open valve 90—92 permitting fuel to flow into the combustion chamber.

The quantity of fuel flow through valve 90—92 is directly proportional to the amount of outward movement of plunger 64. The amount of plunger movement is, in turn, controlled by a manual fuel lever 112. Lever 112 is fixed to a shaft 114 rotatably supported in casing 46. Shaft 114 includes a cam member 116 fixed to the inner end thereof and disposed within casing 46. A stop surface 118 is formed on plunger collar 68 in alignment with cam member 116.

Thus the outward or pumping movement of plunger 64 is limited by the distance between stop surface 118 and the cam member 116. This distance is variable by rotating lever 112 to align a different portion of cam member 116 with surface 118. Thus, if the lowest portion of cam 116 is aligned with stop surface 118, the maximum distance is provided between the cam and the stop surface in turn permitting maximum travel or pumping action of plunger 64. Under this condition the maximum quantity of fuel will be pumped into the combustion chamber. To reduce the quantity of fuel supplied to the combustion chamber, and hence the power output of the engine, cam 116 is rotated to move the cam surface closer to stop surface 118.

After the mixture has been ignited and the piston is moved downwardly through its work stroke, the pressure in the combustion chamber will be decreased to the point where spring 78 will once again move plunger 64 inwardly causing surface 86 of flange 66 to seat against casing 48 and permitting spring 100 to close valve 90—92. This inward or closing movement of plunger 64 will cause fuel in line 18 to be drawn in through passage 62 past ball check valve 106 to once again fill chamber 104 with fuel in preparation for the next pumping stroke.

Thus the present injector without utilizing rotatably driven parts, camshafts, etc. permits a timed and metered quantity of fuel to be injected into the combustion chamber in accordance with operating demand as manifested by the position of fuel control lever 112.

Inasmuch as diaphragm 50 is subjected to high temperature gases and air pressure, such member must be made of a material which can resist such conditions. Accordingly, diaphragm 50 may be made of any suitable material such as stainless steel, beryllium-copper or the like.

To further reduce the deleterious effect of heat on diaphragm 50, the use of the splines 72 in casing portion 52 substantially increases the surface area to which the hot gases are exposed in passing into chamber 74. By increasing the surface area over which such gases pass heat is better dissipated to the surrounding casing structure.

Briefly the operation of this device is as follows: As piston 30 starts upward movement in cylinder 24, the air which replaces burned gases from the previous working stroke is gradually compressed. This pressure is in turn transmitted to chamber 74 acting on diaphragm 50 to overcome the force of spring 78. When spring 78 is overcome, plunger 64 begins moving into the fuel chamber 104. This will occur near the end of the compression stroke. The motion of plunger 64 into fuel chamber 104 will compress spring 100 causing fuel to be forced past valve 90—92 into the engine combustion chamber. The pumping stroke of plunger 64 is adjusted by rotation of control lever 112. By suitable shaping of cam 116, lever 112 can also be rotated to a position in which the cam abuts against surface 118 to stop fuel delivery altogether by preventing any movement of plunger 64.

It is apparent that by changing the strength of spring 78 injection timing can be changed. This can be done by varying the thickness of spacer 80 or by providing a suitable mechanical arrangement permitting the spring force to be varied during normal operation. This latter alternative is the subject of the modification shown in FIGURE 7 and which will now be considered in detail.

Figure 7:
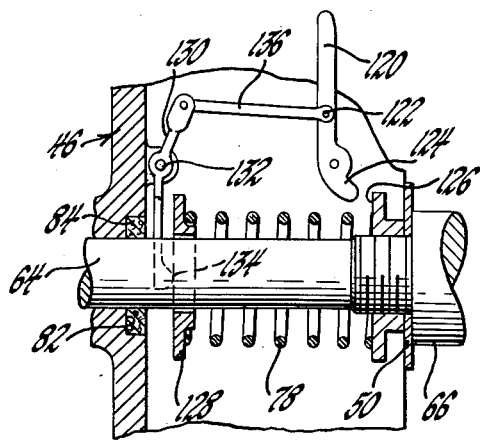
FIGURE 7 is a modification of the fuel control arrangement of the fuel injector.

Referring now to FIGURE 7, an arrangement is shown in which the fuel control lever 120 is made of a slightly different shape. In this case lever 120 is pivotally mounted at 122 and includes a cam surface 124 formed at one end which is adapted to vary the space between the cam and collar surface 126 to regulate the amount of travel of plunger 64. In this instance, previous spacer 80 is replaced by a collar 128 slidably disposed relative to plunger 64. A lever 130 is suitably pivoted at 132 to casing 46 and includes one end 134 adapted to bias against collar 128. The other end of lever 130 is articulated through a link 136 to fuel control lever 120. In this manner, as fuel control lever 120 is moved to vary the amount of plunger travel so is the force of spring varied in some predetermined relationship.

The modification of FIGURE 7 is important in that in stratified combustion engines, one of the type herein disclosed, in which a separate pre-combustion space is utilized, it is sometimes difficult to obtain as good full power output as in a conventional carbureted or fuel injected type engine. In controlling the force of spring 78 simultaneously with plunger stroke adjustment, a relationship is established such that when injection fuel volume is smallest the force of spring 78 is the highest.

In this way, when small load and lean mixture is used, fuel injection will take place with the engine piston in a very high position and with piston rib 40 disposed in cavity 44. This arrangement will permit the ignition of very small fuel charges. On the other hand, when higher load is needed and larger fuel volume is injected, the lesser force of spring 78 will permit earlier fuel injection with rib 40 not yet disposed in cavity 44. The engine will then operate more like any conventional combustion engine using a fuel-air mixture in a proportion permitting satisfactory ignition and burning.

It is apparent that various structural modifications may be made in the subject invention within the intended scope of the invention as set forth in the hereinafter appended claims.

I claim:

1. A charge forming device for an internal combustion engine comprising a cylinder, a piston slidably disposed in said cylinder, said cylinder including a head portion of a wedge shape configuration substantially diametrically coextensive with the diameter of and coacting with said piston to form a combustion chamber and a centrally disposed arcuate cavity extending upwardly from said chamber, a pair of threaded openings formed in said cylinder head and directly communicating with said arcuate cavity, said cylinder head openings being proximately disposed, said piston including a head portion comprised of a first portion corresponding in shape and size to the wedge shaped cylinder head configuration, a second arcuately shaped piston head portion extending upwardly from said first portion and substantially conforming in shape and size to the arcuate cavity, said second piston head portion and arcuate cavity having a clearance space therebetween when said piston is at the top of its stroke to define an auxiliary combustion chamber, a spark device disposed in one of said cylinder openings and a fuel injector mechanism mounted in the other of said cylinder head openings, said injector mechanism being adapted to inject a predetermined quantity of fuel into said arcuate cavity when the combustion chamber pressure exceeds a predetermined value, and manually controlled means for varying the quantity of injected fuel.

2. A charge forming device as set forth in claim 1 in which said cylinder includes air inlet and exhaust gas passages generally aligned on opposite sides of the cylinder, said arcuate cavity and arcuately shaped piston head portion being aligned in the same direction as said air inlet and exhaust passages whereby air flow will carry injected fuel from the injector mechanism toward the proximately disposed spark device.

References Cited in the file of this patent

UNITED STATES PATENTS

| | | |
|---|---|---|
| 1,376,277 | Higgins | Apr. 26, 1921 |
| 2,749,896 | Jarand | June 12, 1956 |
| 3,013,733 | Williams et al. | Dec. 19, 1961 |

FOREIGN PATENTS

| | | |
|---|---|---|
| 720,556 | France | Dec. 4, 1931 |
| 686,869 | Germany | Jan. 18, 1940 |
| 175,766 | Switzerland | Sept. 2, 1935 |
| 179,550 | Switzerland | Feb. 1, 1936 |

UNITED STATES PATENT OFFICE

CERTIFICATE OF CORRECTION

Patent No. 3,124,111　　　　　　　　　　　　March 10, 1964

Vaclav Fuka

It is hereby certified that error appears in the above numbered patent requiring correction and that the said Letters Patent should read as corrected below.

Column 4, line 24, for "16" read -- 106 --; column 5, line 59, strike out "one".

Signed and sealed this 15th day of September 1964.

(SEAL)
Attest:

ERNEST W. SWIDER
Attesting Officer

EDWARD J. BRENNER
Commissioner of Patents